Patented July 7, 1931

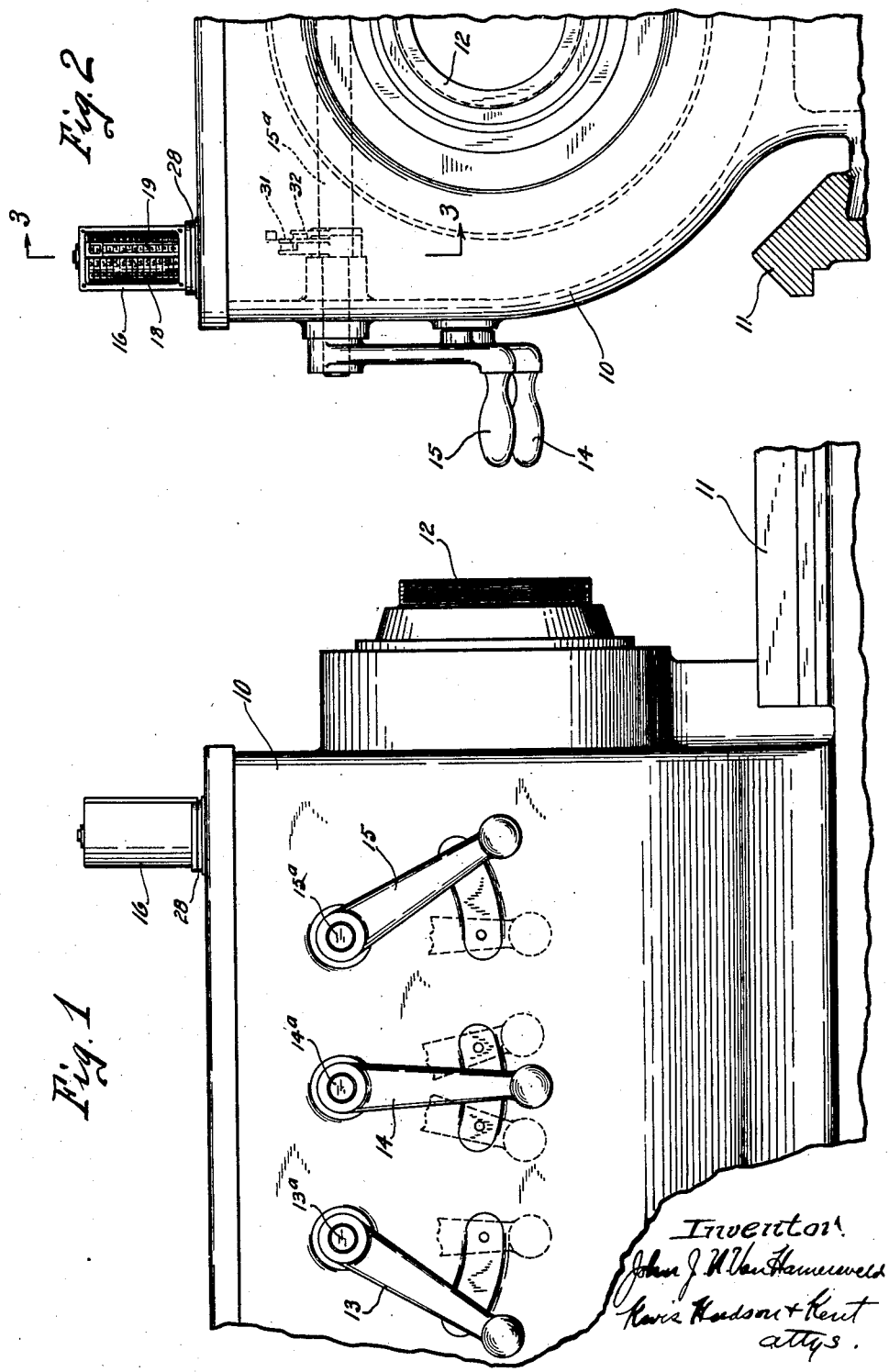

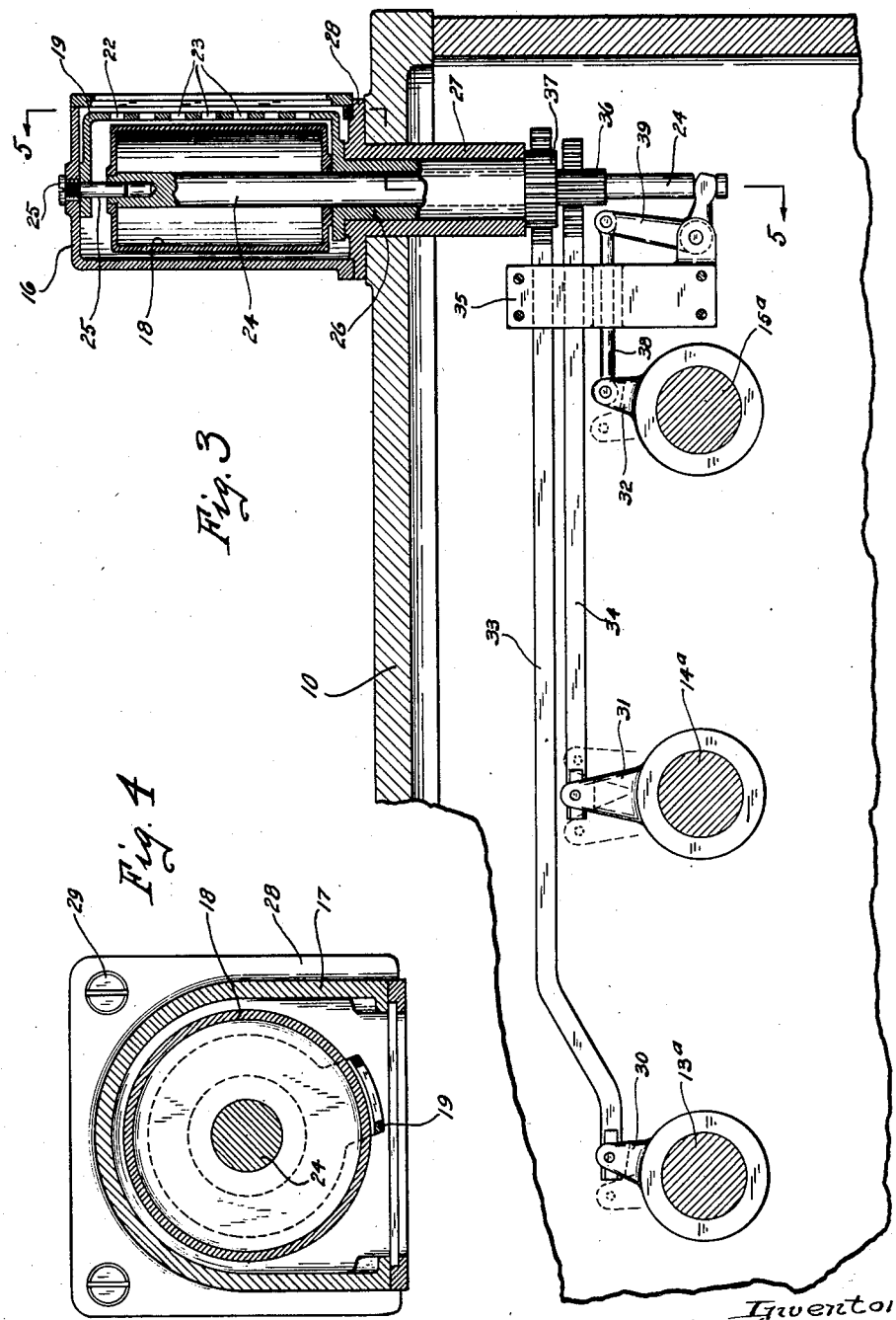

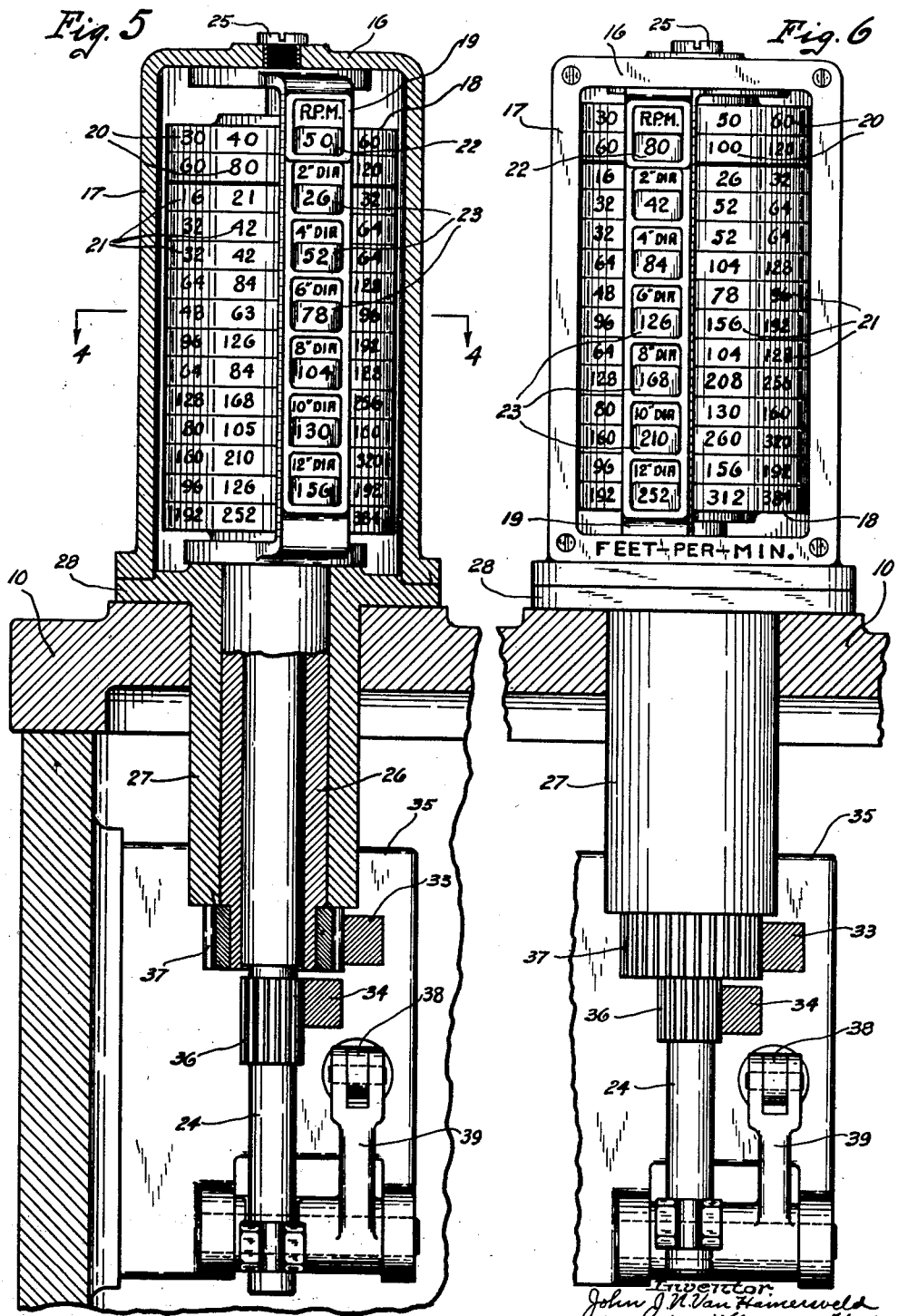

1,813,002

UNITED STATES PATENT OFFICE

JOHN J. N. VAN HAMERSVELD, OF CLEVELAND HEIGHTS, OHIO, ASSIGNOR TO THE WARNER & SWASEY COMPANY, OF CLEVELAND, OHIO, A CORPORATION OF OHIO

INDICATOR

Application filed January 7, 1930. Serial No. 419,096.

This invention relates to an indicator for machine tools, and has for its chief object the provision of an indicator which may be applied to a machine tool and suitably connected to the control member or members for the rotating part, whether a work holder or tool holder, depending upon the type of machine, to enable the operator to have a visual indication of the cutting speed in suitable terms, such as feet per minute, in order that he may determine whether the machine is working at its rated capacity.

The present invention is useful with various kinds of machine tools, such as lathes, vertical boring mills, or other machine tools wherein the work is rotated and such as drill presses, horizontal boring mills, and the like, wherein the tool is rotated relative to the work. It may have utility also in connection with machine tools having a reciprocating bed or other work supporting members, such as planers or the like, or a reciprocating support for the tool, such as shapers or the like.

At the present time, due to the fact that various steels and alloys are supplied for the production of cutting tools, many of which are capable of sustaining without injury much higher cutting speeds than others, considerable confusion or uncertainty exists in the mind of the machine tool operator, even though he may be a skilled operator, as to whether or not the machine is working at its rated capacity or anywhere near it in so far as the cutting speed is concerned, this cutting speed, as is well known, being the product of the rate of rotation of the work or tool, as the case may be, and the diameter of the surface at which the tool is cutting, or it is the rate of reciprocation of the work or tool in machines of the planer or shaper type.

The present invention obviates this uncertainty, and makes it possible for the operator to run the machine at the desired capacity, which is usually termed the rated capacity.

The indicator constituting the subject matter of the present invention may be mounted on any suitable part of the machine tool, but generally where the indicating face is most clearly visible by the operator, and in the preferred embodiment, it comprises indicating devices, one or more of which may be movable and operated by the control levers or other members which control the rate of movement of the work or tool holding member and provided with suitable indicia which will enable the operator to determine the cutting speed or substantially the cutting speed at any instant.

The invention may be further briefly summarized as consisting in certain novel combinations and arrangements of parts which will be described in the specification and set forth in the appended claims.

In the accompanying sheets of drawings, I have shown the invention applied to a lathe in connection with the rotating work spindle and in association with levers for controlling the rate of rotation of the work spindle, but it is to be understood that the illustration of my invention applied to this type of machine is not to be considered in any limiting sense, but is merely illustrative of one of the types of machines to which the indicator may be applied for the attainment of the objects stated.

In the drawings, Fig. 1 is a side view of a portion of a lathe showing particularly the head, a series of control levers for controlling the rate of rotation of the work spindle, and my improved indicator; Fig. 2 is a view looking toward the forward end of the work spindle showing approximately one-half of the head, and showing the indicator in substantially its preferred location on top of the head; Fig. 3 is a vertical sectional view substantially along the line 3—3 of Fig. 2; Fig. 4 is a transverse sectional view through the indicator substantially along the line 4—4 of Fig. 5; Fig. 5 is a sectional view on an enlarged scale substantially along the line 5—5 of Fig. 3; and Fig. 6 is a similar view but showing the indicator in elevation with the movable indicating devices of the indicator differently positioned than in Fig. 5.

Referring now to the drawings, 10 indicates the headstock of the lathe, a portion of the bed of which is shown at 11. The lathe will have the usual work spindle 12 and the speed change mechanism (not shown) by which the work spindle may be driven at a plurality of speeds, and the clutch mechanism (also not shown) by which the spindle may be stopped or started in either direction. The clutch and speed controlling mechanism, the latter consisting usually of shiftable gear cones, are not illustrated as they are well known in the art and no particular mechanism of this character is essential to the indicator proper. Likewise, the number and arrangement of the control levers are immaterial to the invention, the number of control levers determining, of course, the number of permissible speed changes, of which there may be any number. In the present instance, I have shown three speed controlling levers 13, 14 and 15 shown in simplified manner on the front of the headstock.

The indicator, which is designated as a whole by the reference character 16, is preferably mounted on top of the headstock, in this instance near the front forward corner of the headstock, and the front of the indicator faces lengthwise of the machine so as to be readily seen by the operator standing forwardly of the headstock alongside the bed. It may, however, be arranged differently if desired. The details of the indicator may be varied considerably, but in this instance the indicator has a housing 17 in which are two movable indicating devices, one consisting of a drum 18 adapted to be given a step-by-step rotative movement about a vertical axis as well as an endwise or vertical movement. The other indicating device consists of a window strip 19 which may be rocked about a vertical axis. In this instance, as will appear presently, the drum 18 may be given a rotative movement to three different positions; it may be shifted endwise to two different positions, and the window strip may be rocked to two different positions, but it is not essential that these conditions prevail.

With the number and arrangement of levers indicated in Figs. 1 and 2, and with the movements which may be imparted to these levers, indicated in full and dotted lines in Fig. 1 the work spindle is capable of being rotated at twelve different speeds, for, as indicated in Fig. 1, lever 13 is a two-position lever, which means that it controls a two-step gear cone; lever 14 is a three-position lever, in which event it controls a three-gear cone; and lever 15 is a two position lever, which therefore controls a two-step gear cone.

The upper part of the drum is preferably provided with suitable indicia 20 in the form of characters which indicate in terms of revolutions per minute the rate of rotation of the work spindle and of the work supported thereby, it being understood that the work is usually held in a chuck mounted on the forward end of the work spindle. That is to say, the characters 20 indicate the revolutions per minute of the work spindle and work when the indicator is applied to a machine tool, such as a lathe, wherein the work is rotated during the cutting operation. In the event that the indicator is applied to a machine tool wherein the tool is rotated during the cutting operation, such as a drill press, the characters will indicate the rate of rotation of the rotated tool.

Preferably the characters 20 are arranged in two horizontal rows at the upper part of the drum, the characters in one row being directly beneath the characters of the other row, and in the particular embodiment of the invention herein illustrated, each horizontal row consists of six speed indicating characters 20 arranged in spaces disposed around a portion of the periphery of the drum. At this point, it might be stated that it is not essential to the invention that the indicating member 18 be in the form of a complete drum or cylinder, for, since the indicating characters referred to and the others to be next referred to need occupy only a portion of the surface of the drum, this indicating member may be in the form of a segment of a cylinder. In fact it is not essential to the invention that the indicating member be either in the form of a drum or a portion of a drum or cylinder which is moved from one position to another by rotative movement, for it may be in the form of a flat plate which is given a step-by-step rectilinear movement or in a plane. However, the step-by-step rotative movement and, therefore, an indicating member in the form of a drum or a portion of a drum is preferred.

The drum is provided also with other indicia or indicating characters 21 which are arranged in horizontal and vertical rows directly beneath the vertical rows or columns of characters 20, the characters 21 indicating the cutting speed of the tool preferably in feet per minute.

The window strip 19, which is adapted to be given a rocking movement close to and immediately in front of the rows of indicia 20 and 21 is provided near the top with an opening or window 22 which is in front of the top horizontal row of characters 20 when the drum is in its lowermost position, shown in Fig. 5, and is in front of the second or lower horizontal row of characters 20 when the drum is in its elevated position, as shown in Fig. 6. The indicia in the space directly behind this window 22 indicates at any particular time in the use of the machine tool to which the indicator is applied, the revolutions per minute of the rotating work spindle or rotating tool, the indicia or indicating characters 20 which occupy the different spaces of the two upper horizontal rows being so selected as to give this result. Preferably, immediately above the window 22 occurs the legend "R. P. M." which is the abbreviation for revolutions per minute. The window strip 19 is provided beneath the window 22 with a series of additional windows 23, six of these additional windows being here illustrated, the vertical spacing of these windows being such that they are opposite alternate horizontal rows of the indicia 21 so that when the drum is in its lowermost position, indicated in Fig. 5, these windows will be opposite one-half of the horizontal rows of indicia 21, and when the drum is in its elevated positions, shown in Fig. 6, they will be opposite the other half of the horizontal rows of these indicia.

I preferably provide above the different windows 23 legends indicative of the diameter of work piece or tool, as the case may be, these legends indicating in suitable, regular, arithmetical progression increases in the diameter from the uppermost to the lowermost, and in this instance these legends indicate diameter dimensions in terms of inches with increments of diameter of 2 inches per window. That is to say, above the uppermost window 23 appears the legend "2″ dia", meaning a diameter of work or tool of 2 inches, above the next window 23 the legend "4″ dia", etc. It will be understood, of course that the increment in diameter dimensions in the legends above the different windows 23 may be other than 2 inches, as, for example, 1 inch or even a fraction of an inch, or it may be greater than a 2 inch increment. This will usually depend upon the character of the machine and the desired height of the instrument, and, in some instances, on the nature of the work being operated on in the machine.

It was mentioned above that the indicia 20 and 21 might be arranged on a flat member to which might be given a rectilinear movement or a movement in a plane, and it will be obvious that if these characters are arranged on an indicating device of the character just stated, the window strip, instead of being given a rocking movement from one position to another, will also be given a movement in a straight line or in a plane.

Considering next the manner in which the two movable indicating devices illustrated, namely, the drum 18 and the window strip 19, are mounted and the means by which these parts are shifted through the actuation of the control levers 13, 14 and 15, it will be noted by reference to Figs. 3, 5 and 6 that the drum 18 is secured to a shaft 24 which, in the embodiment illustrated, is disposed vertically and extends up through the top of the headstock. The upper part of the shaft is centered by a screw pin 25 extending down through the top of the housing 17. The window strip 19 at its upper end is centered by the pin 25, and at its lower end it is fixed to or is integral with a sleeve 26 which surrounds shaft 24 and in which the latter has a bearing. This sleeve 26 fits into and has a bearing in an outer sleeve 27 which has a close fit in and extends through an opening in the top of the headstock, the upper part of the sleeve 27 having a flange 28 which rests on the top of the headstock and forms the base of the housing 17. The sleeve 27 with its flange 28 and the housing 17 form, in effect, a unit, and, in fact, the entire indicator, including the shaft 24 which rotates with the drum, sleeve 26 which rotates or rocks with the window strip, and the housing 17 and sleeve 27, are inserted in the opening of the headstock and applied thereto as a unit, and after it is applied, this unit can be fixed in position and secured to the top of the headstock by securing devices, such as screws 29 illustrated in Fig. 4.

Any suitable means may be provided to cause movements to be imparted to the indicating devices when the control levers are actuated. In this instance, the levers 13, 14 and 15 are mounted on shaft $13^a$, $14^a$ and $15^a$ which extend through the front wall of the headstock and at their inner ends will be provided with suitable means for shifting the speed changing gear cones or other means for varying the speed of the rotating work piece in those machines wherein the work piece is rotated during the cutting operation, or the tool in those machines wherein the tool is rotated during the cutting operation. Just inside the front wall of the headstock the shafts $13^a$, $14^a$ and $15^a$ are provided with arms 30, 31 and 32 which may be secured to the shafts in any suitable way, but, as indicated in Fig. 3, may be on sleeves keyed or otherwise secured to the shafts. The arms 30 and 31, to which are imparted rocking movements when the control levers 13 and 14 are actuated, have pin and slot connections with two horizontal racks 33 and 34 respectively. These racks, which may be guided for straight line movement in a bracket 35 secured to the inner side of the front wall of the headstock, are provided at their ends opposite the arms 30 and 31 with rack teeth, the teeth of the rack 34 engaging a pinion 36 on shaft 24, the length of the pinion being such that the shaft may be given an endwise movement without disengaging the pinion from the rack. The teeth of rack 33 engage a pinion 37 on the lower end of sleeve 26 to which the window strip is connected.

The arm 32 which is rocked when lever 15 and shaft $15^a$ are actuated is shown in Fig. 3 connected by a link 38 to one arm of a bell crank 39 which may be supported for rocking movement in the bracket 35, as illustrated in Figs. 3, 5 and 6. The other arm of the bell crank straddles a reduced portion at the lower end of shaft 24, the arrangement being such that, when the control lever 15 is rocked from one position to the other, shaft 24, and therefore the drum 18, will be moved from its lowermost position to its uppermost position or from its uppermost position to its lowermost position, depending upon the direction in which the control lever 15 is rocked, the distance of this up or down movement being equal to one space in the horizontal arrangement of the characters 20 and 21 on the drum. As the hand lever 13 is actuated, the window strip will be moved from its right-hand position, shown in Fig. 5, to its lefthand position, shown in Fig. 6, or vice versa, the extent of this movement being equal to one space in the arrangement of vertical rows of characters 20 and 21. If the lever 14 is a three-position lever, as in this instance, the drum 18 will occupy one of three different positions and will be moved from one position to another as the lever 14 is moved from one operative position to another, but the parts are so proportioned that, when the drum is moved from any one of its positions to another by the movement of control lever 14 from one operative position to another, the drum is rocked two spaces with respect to the vertical rows of indicia 20 and 21.

In this way, each time any one of the three levers 13, 14 and 15 is actuated to change the rate of rotation of the work or tool, a movement is imparted to one of the indicating devices, one of these levers imparting a rocking movement to the window strip, one a rocking movement to the drum, and the other an endwise movement to the drum.

By the three movements thus imparted to the indicating devices in the directions and to the extent explained, and by the proper arrangement of the characters indicating the R. P. M. and of the characters indicating the cutting speeds at different diameters, the whole surface of the drum or of that portion covered by the characters can be covered for reading purposes, and it is only necessary for the operator to observe the characters behind the window corresponding to the particular diameter of the tool he is using or the diameter of the surface of the work piece at which the cut is being taken to determine without calculation the particular cutting speed in feet per minute. Generally the workman knows the rated or greatest permissible speed of the tool that he is using for a work piece of a given material, and by the reading which he takes from the indicator, he will be able to shift the control levers so as to have the machine operate at substantially its rated capacity. This indicator is useful also in enabling one, such as a foreman, who might be disposed to check the operation of the workmen under him, to go from machine to machine and see at a glance whether or not the operators are working the machines too slowly or too fast.

I have described one embodiment of the invention in which there are three speed control levers actuating two movable devices of the indicator, two of the levers serving to give movements of different kinds to one of the indicating devices, but these are not at all essential features of the invention. For example, the indicator is equally applicable, with slight modifications, to machines having less or more than twelve different speeds for the work or tool and for a system of control which does not require three control levers even though the speed change mechanism may admit of more than twelve different speeds of operation. Likewise, it is applicable, with slight modifications in the form of the indicator, to machines in which the work or tool is reciprocated, in which event the movable devices of the indicator may be associated with the speed control members substantially as herein illustrated. I therefore aim in my claims to cover all modifications which do not involve a departure from the spirit and scope of the invention, it being understood that the number of movements which are imparted to the indicating devices or to one or more of them will depend upon the number of control levers and the particular speed control mechanism of the machine to which the indicator is applied. Likewise, my invention is adaptable for other arrangements of speed control levers than herein illustrated, as it is not essential that part, or any of the control levers for that matter, be arranged on the front wall of the headstock or other part of the machine containing the speed control mechanism. It will likewise be understood that the indicator may be mounted differently than herein illustrated with respect to the part of the machine containing the speed control mechanism and with respect to the control levers or other control members. For example, it may be built into the headstock or mounted in or on any part which proves to be the most convenient for any particular machine tool.

Having thus described my invention, I claim:

1. An indicator adapted to be applied to a machine tool having either a rotating work piece or a rotating tool and control members therefor, said indicator adapted to be associated with the control members and having means for indicating substantially the cutting speed of the tool at different diameters of the work.

2. An indicator adapted to be applied to a machine tool having either a moving work piece or a moving tool and adapted to be associated with the control member or members for the moving part, said indicator having means for indicating substantially the cutting speed of the tool at different diameters of the work.

3. An indicator adapted to be applied to a machine tool having either a rotating work piece or a rotating tool and adapted to be associated with the control member or members for the rotating part, said indicator having provision for indicating the cutting speed for different diameters of a surface at which the cutting takes place.

4. An indicator adapted to be associated with the control member or members of a machine tool having a moving work piece or a moving tool and having a plurality of indicating devices for indicating the surface speed of the work at different diameters thereof.

5. An indicator adapted to be applied to a machine tool having either a moving work piece or a moving cutting tool and having provision for indicating cutting speed, said indicator including a movable indicating member movable in two different directions.

6. An indicator adapted to be associated with the control member or members of a machine tool having a moving part and having provision for indicating cutting speed, said indicator having a plurality of movable indicating devices, one movable in two different directions.

7. In combination with a machine tool having a rotating part in the form of a work holder or a tool, and an indicator associated with a part of the machine tool and having provision for indicating cutting speed at different diameters.

8. In combination with a machine tool having a variable speed movable part in the form of a work holder or tool holder, control means for such part, and an indicator associated with the control means and having provision for indicating the cutting speed of the tool at different diameters of the work.

9. In combination with a machine tool having a movable part in the form of a work holder or tool holder, a control for the moving part including a plurality of control members, and an indicator associated with the control members having provision for indicating the cutting speed.

10. In combination with a machine tool having a variable speed movable part in the form of a work holder or tool holder, a control for the moving part, and an indicator including a plurality of relatively movable indicating devices associated with the control and having provision for indicating cutting speed.

11. The combination with a machine tool having a variable speed rotatable part in the form of a work holder or cutting tool, and means for controlling the speed of such part, including a plurality of control members, of an indicator associated with and actuated by said control members and having provision for indicating cutting speed at different diamters.

12. In combination with a machine tool having a variable speed rotatable part in the form of a work holder or cutting tool, and a control for such part comprising a plurality of control members, of an indicator for indicating cutting speed at different diameters having a plurality of indicating devices operated by said control members.

In testimony whereof, I hereunto affix my signature.

JOHN J. N. VAN HAMERSVELD.